Dec. 15, 1953  J. E. GODECK  2,663,014
POSITION INDICATING SYSTEM
Filed Dec. 5, 1940

INVENTOR.
John E. Godeck
BY Ralph B. Stewart
Attorney

Patented Dec. 15, 1953

2,663,014

UNITED STATES PATENT OFFICE 2,663,014

POSITION INDICATING SYSTEM

John Edward Godeck, London, England, assignor to A. C. Cossor Limited, London, England, a company of Great Britain Application December 5, 1940, Serial No. 368,743

Claims priority, application Great Britain December 5, 1939

14 Claims. (Cl. 343—11)

This invention relates to apparatus for indicating the instantaneous distances and angular bearings of bodies from an origin in space, of the kind comprising means to transmit a succession of signals from the origin, means to receive at the origin echoes of the signals from the bodies, at least one of said means being directional and rotatable, and means responsive to the time separation between transmitted signals and the corresponding echoes to determine the instantaneous distances of the bodies from the origin.

In apparatus of this kind according to the invention, indications are produced on a surface by means such that the co-ordinates of each indication represent (1) the time separation of a transmitted signal and the corresponding echo and (2) the instantaneous direction of transmission of this signal and/or reception of this echo.

It is preferred that the co-ordinates of each indication which represent these quantities shall be the polar co-ordinates, so that there appears on the surface approximately a plan view of the bodies present within the range of indication. The distances, however, as measured on this view from the origin of co-ordinates upon the surface will represent actual distances of the bodies from the origin in space, and not merely the horizontal components of these distances.

Figure 1:
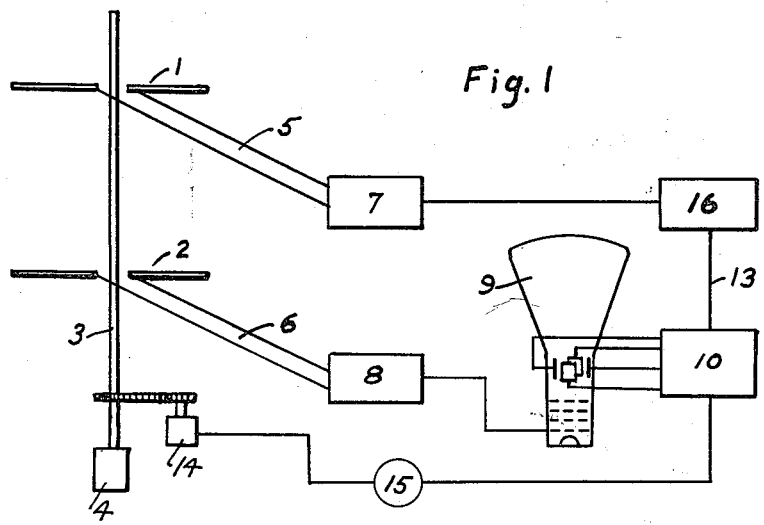
Figure 2:
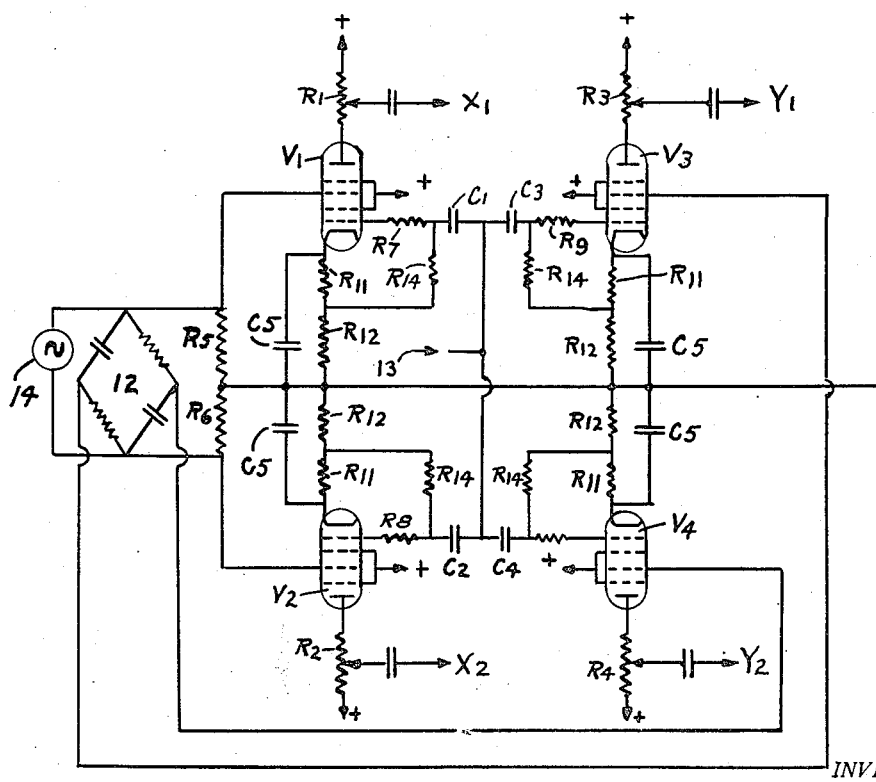

A specific embodiment of the invention will now be described by way of example with reference to the accompanying drawings, in which Figure 1 is a schematic diagram of the transmitter and receiver and associated apparatus while Figure 2 is a circuit diagram of a part of the apparatus which serves to produce appropriate deflections of the beam of the cathode ray tube.

In Figure 1, there are diagrammatically represented at 1 and 2 aligned transmitting and receiving aerial arrays, each having acute maximum directional properties. Each of these aerial arrays may, for example, be of the Yagi type.

The arrays 1 and 2 are mounted to be rotated together on the shaft 3 by motor 4 at a speed of a few revolutions per second. Feeders 5 and 6 connect the aerials 1 and 2 to transmitter and receiver circuits 7 and 8 respectively.

Transmitter 7 is so designed as to transmit from aerial 1 a regular succession of pulses of radio waves of frequency about 200 megacycles. The duration of each pulse is of the order of three microseconds and the spacing between pulses of the order of 100 microseconds which corresponds to a pulse emission frequency of the order of 10,000 pulses per second. Aerials 1 and 2 and feeders 5 and 6 must, of course, be proportioned with regard to the frequency of the waves to be transmitted.

Cathode ray tube 9 has four preferably equisensitive deflector plates which receive their deflection potentials from deflection control circuit 10. This circuit 10 is shown in detail in Figure 2; its function is to produce deflection of the spot on the cathode ray tube screen in a circular path at constant angular velocity in response to a sine wave input voltage and to produce radial deflection of the spot in proportion to another input voltage.

In Figure 2, valves $V_1$, $V_2$, $V_3$, $V_4$ are hexodes or other valves of similar operating characteristics. The outputs of valves $V_1$ and $V_2$ are applied to one pair of deflector plates $X_1$, $X_2$ of cathode ray tube 9, while the outputs from valves $V_3$ and $V_4$ are applied to the other pair of deflector plates $Y_1$, $Y_2$. Tappings are provided on the output resistors $R_1$, $R_2$, $R_3$, $R_4$ to provide for any necessary relative adjustment.

The injection grids are fed with sine wave potentials from source 14. Equal resistors $R_5$, $R_6$ provide a point for earth connection so that the inputs to the injection grids of valves $V_1$, $V_2$, are in push-pull, balanced about earth. Condenser and resistance bridge 12 provides input potentials for the injection grids of valves $V_3$, $V_4$, in push-pull with each other and in quadrature with the inputs to the injection grids of valves $V_1$, $V_2$.

If all the valves $V_1$, $V_2$, $V_3$, $V_4$ give equal amplification, the trace of the spot on the screen of the cathode ray tube will be circular.

The radial deflector voltages for the control grids of valves $V_1$, $V_2$, $V_3$, $V_4$ are all applied in parallel from line 13, through condensers $C_1$, $C_2$, $C_3$, $C_4$ and through resistances $R_7$, $R_8$, $R_9$, $R_{10}$, the purpose of which is to prevent parasitic oscillations. The effect of any change of voltage supplied at 13 is, therefore, to change the slopes of all the valves $V_1$, $V_2$, $V_3$, $V_4$ equally and in synchronism and thus to change the radius of the circular trace without varying its circular character. In other words, the voltage applied to the control grids of the valves varies the gain of the amplifiers and thereby produces radial deflection of the cathode ray beam: Resistances $R_{11}$, $R_{12}$, with by-pass condensers $C_5$ provide self-biassing for the control grids through resistances $R_{14}$ and for the injection grids through resistances $R_5$, $R_6$ and the bridge network 12.

The input sine wave source for the injection grids of the valves is represented in Figures 1 and 2 by alternator 14, which is driven in synchronism with the rotation of the aerials so as to produce a sine wave voltage having a frequency equal to the frequency of revolution of the aerials. The output of alternator 14 is passed through a phase adjuster 15 to deflection control circuit 10.

A radial sweep of the spot on the cathode ray tube screen, outwards from the centre and of constant velocity, is required to commence at the instant of each transmission of a pulse from aerial 1. To produce this sweep, a linear saw-tooth generator 16 is connected to transmitter 7 so that a fly-back is caused each time a pulse is transmitted. The saw-tooth output voltage is injected at 13 (see Figure 2) in the deflection control circuit 10.

The cathode ray tube control grid is so biassed that in the absence of any received signal on aerial 2, the beam is cut off. When, however, the echo of a signal transmitted from aerial 1 is received on aerial 2, it is passed through receiver circuits 8 to the control grid of cathode ray tube 9, and beam current is momentarily permitted to flow producing an illuminated spot on the fluorescent screen, at the position to which the notional beam has been deflected at that instant by the deflection voltages derived from circuit 10. Signal limiting means are preferably provided so that signals received at different amplitudes will produce substantially similar indications upon the cathode ray tube screen.

If desired, the control grid voltage applied to the cathode ray tube may be inverted so that beam current is normally flowing, but is suppressed when an echo signal is received, thereby forming a dark spot on a generally illuminated screen.

The time between successive transmitted pulses should preferably be about two or three times the total time taken for a signal to travel to and for the echo to return from a body situated at the furthest distance from the origin at which the presence of bodies is to be indicated. Any reflected signals from bodies outside the range of indication, but still sufficiently near to give reflections of considerable strength, will then be unable to produce spurious indications upon the screen because at the time of their arrival the notional beam will be deflected off the screen.

If very low speeds of rotation are employed, a cathode ray tube with a long afterglow screen should be used so that a spot does not entirely fade away before it is repeated. This has the further advantage that if a body, the presence of which is being indicated, is moving relatively to the aerials, a fading tail behind the moving spot will be seen and will indicate the direction of the relative movement.

The rate of rotation of the directional element is not critical but, as indicated above, is dependent somewhat upon the character of the screen used in the cathode ray tube. The frequency of pulse transmission will depend both on the rate of rotation of the directional element and the amount of detail desired in the indication on the screen. For good definition, the pulse frequency must be very high with respect to the frequency of rotation of the directional element.

Instead of using an ordinary cathode ray tube constructed for deflection in rectangular coordinates in conjunction with a deflection control circuit, such as that described with reference to Figure 2, it may be preferred to use a cathode ray tube specially constructed for deflection in polar co-ordinates.

Instead of a constant velocity of radial traverse of the beam across the screen, a traverse may be employed according to another predetermined law relating velocity and time. For example, the velocity may decrease with time so that the distance scale across the screen is more open near the origin than near the edge of the screen.

The purpose of the phase adjuster 15 is to adjust the direction of deflection upon the screen of the cathode ray tube which shall correspond to any given direction of an indicated body in space. For example, if the apparatus be mounted on a ship, and the tube be mounted with screen horizontal, the phase adjuster may be set so that a deflection of the spot in the direction away from the operator indicates the presence of an object directly ahead of the ship.

The saw-tooth generator 16, instead of having its frequency controlled by the transmitter 7, may itself be the basic timing element, and may upon the occurrence of each of its fly-backs cause the transmission of a pulse signal by transmitter 7. Alternatively, the need for a separate saw-tooth generator 16 may be avoided if a component of the transmitter normally undergoes voltage variations of appropriate waveform and phase for the radial deflection control.

It is not necessary that both the transmitting and the receiving aerial shall be directional and arranged for rotation; either one or the other may be omni-directional, and stationary.

Instead of either or both of the aerials being of a type such as the Yagi having an acute direction of maximum response, both may be of a type having an acute minimum, being for example of a kind having a polar diagram of cardioid form, or one may be of such type while the other is omni-directional. In either of these cases a spot will appear on the screen, at a distance from the centre corresponding to the distance of the echo-producing body from the aerials, during every radial sweep of the electron beam except those sweeps which occur when the body is in the direction of minimum response. The echoes from a single body of small size will, therefore, cause the appearance on the screen of a single circular trace interrupted at one point in its circumference. Any further echo-producing bodies coming within the range of the indicating apparatus at different distances from the transmitter will produce each a further interrupted circular trace on the screen.

Instead of rotatable aerials, suitable radiogoniometric apparatus may be employed in conjunction with fixed aerials.

Apparatus according to the invention may be arranged to operate at a fixed ground station, or it may be mounted on a ship or an aircraft.

The invention may be modified for application to a system in which frequency modulated waves are radiated, and in which the distance of reflecting bodies from the source is measured by observing the difference at each instant between the frequency of the transmitted and the reflected wave.

In applying the invention to such a system, provision may be made for varying the tuning of a circuit over an appropriate range of difference frequencies, such variation being made in synchronism with each radial sweep of the cathode ray tube beam. The received reflected wave is heterodyned with the transmitted wave, and when the tuned frequency of the circuit passes through the difference frequency obtained by heterodyning, resonance occurs. Means are provided to operate in response to this resonance to change the control grid voltage of the cathode ray tube, so as to produce a light or dark spot on the screen. Owing to the synchronism of the circular deflection of the cathode ray tube with the direction of transmission and/or reception, and the synchronism of the radial deflection with the tuning of the resonant circuit, the position of the spot will correspond with the distance and direction from the aerials to the body from which the reflected wave is received.

According to another form of the invention, the indicating surface is built up as a mosaic of the free ends of vibrating reeds such as are used in a well-known type of frequency meter. All the reeds at any specific distance from an origin upon this surface have the same natural frequency of vibration, and this increases linearly, or according to any other desired law, with distance from the origin.

A frequency modulated wave is transmitted, and the difference frequency obtained by heterodyning the transmitted and reflected waves is applied at each instant to the exciting coils of all reeds situated along a radial line extending from the origin. This radial line corresponds to the direction in which the wave is being transmitted and reflected, and it is continuously rotated by the provision of a rotating contact arm feeding the reed-exciting coils. Preferably the reed-exciting coils, one of which is provided for each reed, should be short-circuited when not connected to the contact arm, to minimize spurious indications.

In another modification of the invention for use with a rotating, frequency-modulated beam, a mosaic of indicating lamps is employed, the circuits of which are controlled by a rotating contact arm, and further controlled by relays responsive to resonant circuits. Only one resonant circuit need be provided for all lamps at any one radial distance from the origin, and its resonant frequency will correspond with that distance.

Any of the aerial systems and methods of indication above described in relation to pulse transmission may equally be employed with any of these frequency-modulation systems.

I claim:

1. Apparatus for indicating the instantaneous distances and angular bearings of bodies from an origin in space comprising means to transmit a succession of signals from the origin, means to receive at the origin echoes of the signals from said bodies, at least one of said means being directional and rotatable, a cathode ray tube having deflection control means to produce deflection of the beam thereof in two mutually perpendicular directions, a deflection control circuit comprising four electron tubes each having an injection grid and a control grid, the output circuits of said tubes being connected to the deflection controls of said cathode ray tube, a source of sine wave voltage varying in timed relation with the rotation of said directional means, means for applying to the injection grids of said tubes sine wave voltages from said source in predetermined phase relations to produce rotation of the cathode ray beam in synchronism with the rotation of said directional means, means for applying to the control grids of said tubes upon the transmission of each signal a voltage increasing progressively in value from substantially zero to a predetermined value whereby the said beam is deflected radially of its normal axis, and means controlled by said echo receiving means for producing a variation in intensity of said cathode ray beam at the instant of receipt of an echo.

2. Apparatus for indicating the distance and angular bearings of bodies from an origin in space so as to display a plan of the environs of said origin and of objects stationary or moving within those environs comprising means to transmit periodically recurring pulses of a signal wave from the origin, means at the origin to receive echoes of said transmitted pulses, at least one of said means including a directional element turnable about a vertical axis at said origin, means for producing continuous rotation of said directional element about said vertical axis, an indicator comprising a cathode ray tube having means for producing an electron beam, means producing a field for deflecting said beam radially of its normal axis, means for producing turning of said field about the axis of said tube to effect angular deflection of the beam about its normal axis in synchronism with the turning movement of said directional element, means synchronized with the transmission of said pulses to increase progressively the strength of said turning deflecting field following transmission of each pulse from substantially zero to a predetermined value, whereby the beam of said tube is deflected radially of said tube for each transmitted pulse and is deflected in angularly spaced radial directions on successive pulses, and means responsive to the receipt of a reflected signal pulse for varying the intensity of the electron beam.

3. Apparatus for indicating the distance and angular bearings of bodies from an origin in space so as to display a plan of the environs of said origin and of objects stationary or moving within those environs comprising means to transmit periodically recurring pulses of a signal wave from the origin, receiving means at the origin to receive echoes of said transmitted pulses, at least one of said means including an antenna having a directional energy transfer pattern, means for continuously rotating said directional pattern in one direction about a vertical axis, an indicator comprising a cathode ray tube having a viewing screen and means for producing an electron beam, means producing a field for deflecting said beam radially from its normal axis, means for rotating said field about the axis of said tube to effect rotation of the beam about its normal axis in synchronism with the rotation of said directional pattern, means synchronized with the transmission of said pulses to increase progressively the strength of said rotating deflecting field following transmission of each pulse from substantially zero to a value sufficient to deflect said beam to the peripheral edge of said screen, the recurrence frequency of said signal wave pulses being many times greater than the frequency of rotation of said directional pattern, whereby the beam of said tube is deflected radially of said screen many times for each rotation of said beam and is deflected in angularly spaced radial directions on successive pulses, and means controlled by said receiving means for varying the intensity of said beam upon receipt of an echo pulse.

4. Apparatus for indicating the distance and angular bearings of bodies from an origin in space so as to display a plan of the environs of said origin and of objects stationary or moving within those environs comprising means to transmit periodically recurring pulses of a signal wave from the origin at a pulse frequency of the order of thousands of pulses per second, receiving means at the origin to receive echoes of said transmitted pulses, at least one of said means including an antenna having a directional energy transfer pattern, means for continuously rotating said directional pattern in one direction about a vertical axis at a frequency of revolution which is very small with respect to said pulse frequency, an indicator comprising a cathode ray tube having means for producing an electron beam and having two pairs of beam deflecting elements for producing two deflecting fields at right angles to each other, a sine-wave generator driven in synchronism with the rotation of said pattern, means energizing said two pairs of deflecting elements with sine wave energy supplied from said generator, one pair being in quadrature phase relation with respect to the other pair, thereby to effect rotation of the electron beam about its normal axis in synchronism with the rotation of said directional pattern, means generating a saw-tooth pulse upon the transmission of each signal pulse, and means controlled by said saw-tooth pulses for varying the energizing forces supplied to said two pairs of deflecting elements from said generator in accordance with the wave form of said saw-tooth pulses, whereby the beam of said tube is radially deflected many times for each rotation of said beam, and means controlled by said receiving means for varying the intensity of said beam upon receipt of an echo pulse.

5. An indicator for a distance and bearing determining system comprising a cathode ray tube having means for producing an electron beam and two pairs of beam deflecting elements for producing two deflecting fields at right angles to each other, a source of alternating current of sine-wave form, including an amplifier for energizing one pair of said deflecting elements from said source, means including a second amplifier for energizing the second pair of deflecting elements from said source of quadrature phase relation with respect to said first pair of deflecting elements, whereby said beam is rotated about the axis of said tube at the frequency of said source, a source of saw-tooth waves having a frequency many times that of the frequency of said source of alternating current, and means varying the gain of said amplifiers in accordance with said saw-tooth wave whereby the beam of said tube is deflected radially many times during one revolution of said beam.

6. An indicator for a distance and bearing determining system comprising a cathode ray tube having means for producing an electron beam and two pairs of beam deflecting elements for producing two deflecting fields at right angles to each other, a source of alternating current of sine-wave form, means for energizing both pairs of said deflecting elements from said source, one pair of deflecting elements being energized in quadrature phase relation with respect to the other pair of deflecting elements, whereby said beam is rotated about the axis of said tube at the frequency of said source, a source of saw-tooth waves having a frequency many times that of the frequency of said source of alternating current, and means controlled by said saw-tooth waves for varying the instantaneous amplitudes of the energizing forces applied to said two pairs of deflecting elements in accordance with the wave form of said sawtooth wave whereby the beam of said tube is deflected radially many times during one revolution of said beam.

7. Apparatus for producing a plan indication of the distances and angular bearings of bodies located in a horizontal plane, and with respect to an origin in said plane, comprising means to transmit from the origin a regular succession of pulses of radio waves of very short wave-length and of substantially constant frequency, said pulses being of short duration and comparatively long intervals between successive pulses, means at the origin to receive echoes of said transmitted waves, at least one of said means being directional and rotatable about a vertical axis at said origin, means for producing continuous rotation of said rotatable means in one direction about said vertical axis, an indicator having a circular indicating area, and means controlled by said received echo signal wave for producing a localized indication within said area, said indication producing means including means operating in timed relation with the rotation of said directional and rotatable means for rotating the angular position of said localized indication about the center of said area at constant velocity, and means varying in accordance with the elapsed time between the instant of transmission of a signal and the instant of receipt of its echo for varying the radial distance of said localized indication from the center of said indicating area.

8. Apparatus for producing a plan indication of the distances and angular bearings of bodies located in a horizontal plane, and with respect to an origin in said plane, comprising means to transmit from the origin a regular succession of pulses of radio waves of very short wave-length and of substantially constant frequency, said pulses being of short duration and comparatively long intervals between successive pulses, means at the origin to receive echoes of said transmitted waves, at least one of said means being directional and rotatable about a vertical axis at said origin, means for producing continuous rotation of said rotatable means in one direction about said vertical axis, an indicator having a circular indicating area, and means controlled by said received echo signal wave for producing a localized indication within said area, said indication producing means including means operating in timed relation with the rotation of said directional and rotatable means for rotating the angular position of said localized indication about the center of said area so that said indication is at all times located on a radial line corresponding to the direction of transmission and reflection of said waves, and means varying in accordance with the elapsed time between the instant of transmission of a signal and the instant of receipt of its echo for varying the radial distance of said localized indication from the center of said indicating area in accordance with said elapsed time.

9. Apparatus for indicating the distances and angular bearings of bodies from an origin in space comprising means to transmit from the origin signal waves of a frequency which varies progressively at a uniform rate, means at the origin to receive echoes of said transmitted waves reflected from a distant body, at least one of said means being directional and rotatable about a given axis at said origin, means for producing rotation of said rotatable means about said axis, means for combining said received waves with waves transmitted from the origin to produce a beat wave of a frequency proportional to the distance to said reflecting body from said origin, an indicator comprising a cathode ray tube, means for producing circular deflection of the beam of said tube in synchronism with the rotation of said rotatable means, means for producing periodic radial deflection of said beam at a frequency many times higher than the frequency of circular deflection, a tuned circuit energized by said beat wave, means to vary the resonant frequency of said tuned circuit through a given range with each radial sweep of said beam, and means controlled by the current in said tuned circuit for varying the intensity of said beam.

10. Apparatus for indicating the distance and angular bearings of bodies from an origin in space comprising means to transmit periodically recurring pulses of a signal wave from the origin, receiving means at the origin to receive echoes of said transmitted pulses, at least one of said means including an antenna having a directional energy transfer pattern, means for continuously rotating said directional pattern in one direction about a vertical axis, an indicator comprising a cathode ray tube having a fluorescent viewing screen and means for producing an electron beam, means producing a field for deflecting said beam radially from its normal axis, means for rotating said field about the axis of said tube to effect rotation of the beam about its normal axis in synchronism with the rotation of said directional pattern, a sawtooth wave generator synchronized with the transmission of said pulses for generating a sawtooth pulse for each transmitted signal pulse, means controlled by said sawtooth generator to increase progressively the value of said deflecting field following transmission of each pulse from substantially zero at the instant of transmission to a value sufficient to deflect said beam to the peripheral edge of said screen within an integral fractional part of the period between transmitted impulses and to maintain said field above said value for the remainder of said period, whereby said beam is held deflected beyond the edge of said screen for the remainder of said period, the recurrence frequency of said signal wave pulses being many time greater than the frequency of rotation of said directional pattern, whereby the beam of said tube is deflected radially of said screen many times for each rotation of said beam, and means controlled by said receiving means for varying the intensity of said beam upon receipt of an echo pulse.

11. An indicator for a distance and bearing determining system comprising a cathode ray tube having means for producing an electron beam, a plurality of pairs of aligned beam-deflecting elements, the elements of each pair being positioned on opposite sides of the normal axis of said beam, and the axes of said pairs being spaced angularly about said normal axis, a source of sawtooth waves, means energizing each pair of beam-deflecting elements in accordance with amplitude variations of said sawtooth wave, and means for varying the peak amplitude and direction of the sawtooth forces energizing each pair of elements in accordance with a sine-wave form of a frequency which is very small with respect to the frequency of said source of sawtooth waves, the sine-wave forms for said pairs of elements being displaced in time phase according to the angular displacement of the axes of said pairs of elements about the normal axis of said beam, whereby said beam is deflected radially from its normal axis at the frequency of said source of sawtooth wave and successive radial deflections are rotated about said normal axis at the lower frequency of said sine-wave form.

12. In an indicating system of the type employing a cathode ray beam tube having two sets of beam deflecting means, a beam deflection signal generator comprising in combination a signal channel connected to one of said deflecting means and a second signal channel connected to the other of said deflecting means, and means for applying to each of said channels a saw-tooth wave signal whose amplitude varies sinusoidally and wherein the sinusoidal variation of the signal in one of the said channels is displaced in phase from the sinusoidal variation of the signal in the other of the said channels by 90 degrees.

13. The method of rotating the plane of deflection in an indicating system of the type wherein there is employed a cathode ray tube comprising the steps of sinusoidally varying the amplitude of a saw-tooth wave signal and controlling the deflection of the cathode ray beam of said tube in one direction therewith and varying the amplitude of a similar saw-tooth wave signal sinusoidally at the same frequency but displaced in phase by 90 degrees from the other of said sinusoidal variations and deflecting the cathode ray beam in a direction perpendicular to the direction of the first deflection with the latter of the varying saw-tooth wave signals.

14. In an indicating system, a cathode ray tube having a plurality of deflecting means which are angularly displaced with respect to each other about the longitudinal axis of said tube, a plurality of signal channels each of which is connected to a separate one of said deflecting means, and means for applying to each of said channels a saw-tooth wave signal whose amplitude varies sinusoidally and wherein the sinusoidal variation of the signal in any one of said channels is displaced in phase from the sinusoidal variation of the signal in any other one of said channels by an amount which causes rotation of the plane of deflection of said cathode ray.

JOHN EDWARD GODECK.

References Cited in the file of this patent

UNITED STATES PATENTS

| Number | Name | Date |
| --- | --- | --- |
| 1,973,673 | Rice | Sept. 11, 1934 |
| 2,098,287 | Gent | Nov. 9, 1937 |
| 2,130,912 | Tolson | Sept. 20, 1938 |
| 2,154,127 | Hollmann | Apr. 11, 1939 |
| 2,172,395 | McSpadden | Sept. 12, 1939 |
| 2,207,267 | Plaistowe | July 9, 1940 |
| 2,228,266 | Gray | Jan. 14, 1941 |
| 2,231,929 | Lyman | Feb. 18, 1941 |
| 2,313,966 | Poch | Mar. 16, 1943 |
| 2,536,771 | Rost | Jan. 2, 1951 |

FOREIGN PATENTS

| Number | Country | Date |
| --- | --- | --- |
| 108,556 | Australia | Sept. 14, 1939 |

OTHER REFERENCES

The Cathode Ray Oscillograph in Radio Research, published April 1933, His Majesty's Stationery Office, London, England, pages 87-91. Copy in Division 51.